Dec. 22, 1964  V. N. ALBERTSON ETAL  3,162,048
PRESSURE TESTING DEVICE
Filed Nov. 18, 1960
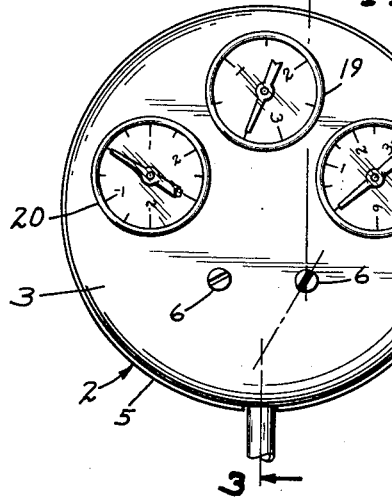
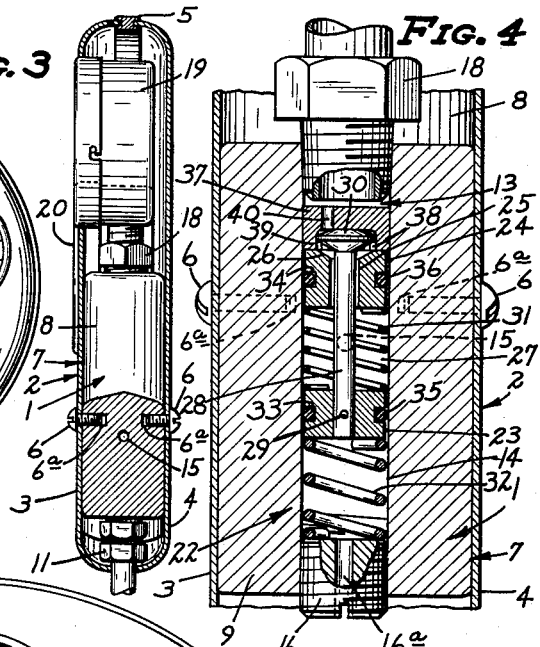
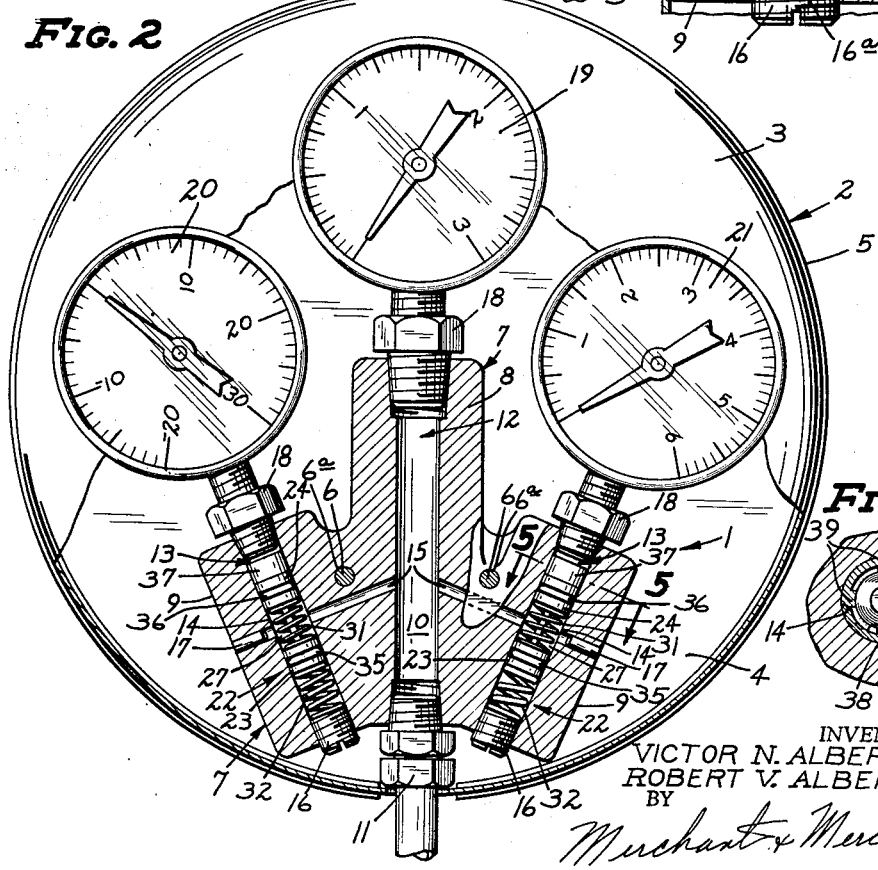
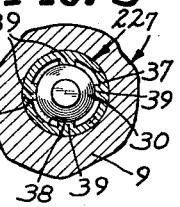
INVENTORS
VICTOR N. ALBERTSON
ROBERT V. ALBERTSON
BY
Merchant & Merchant
ATTORNEYS

United States Patent Office 3,162,048
Patented Dec. 22, 1964

3,162,048
PRESSURE TESTING DEVICE
Victor N. Albertson and Robert V. Albertson, Minneapolis, Minn., assignors to Minnesota Automotive, Inc., Mankato, Minn., a corporation of Minnesota
Filed Nov. 18, 1960, Ser. No. 70,168
3 Claims. (Cl. 73—420)

This invention relates generally to testing devices and equipment for fluid pressure systems, and more particularly it relates to a pressure testing device adapted to carry in a unit a plurality of pressure sensitive gauges of different pressure ranges.

The underlying problems leading to the development of this invention become manifest in a situation wherein the periodical testing of pressures in fluid pressure systems is a necessity since the fluid pressures are more or less critical. In such situations, such as in maintenance work, it is common practice for the persons engaged in the making of the periodical tests to carry with them or have at their disposal several pressure sensitive gauges of varied and different pressure ranges since the cost of a single gauge having the required variance and pressure range and also graduated in sufficient detail to produce satisfactory readings at relatively moderate pressure ranges is usually entirely prohibitive.

In light of the above, an important object of this invention is the provision of a pressure testing device adapted to be operatively coupled to pressure sensitive gauges of different and widely varying pressure ranges, which device is provided with means for protecting the individual gauges from damage by exposure to fluid pressure beyond the range thereof. It should be noted that although the above-stated problems are excellently illustrated in the use of our invention as a protective device for a multiple gauge-equipped pressure testing device, they are not so limited in occurrence. Thus, the foregoing is not intended to restrict the solutions which the present invention affords to application with protective devices for a multiple gauge-equipped pressure testing device nor even to other types of pressure testing devices, inasmuch as many other forms of testing devices may be similarly effected by the application of our invention.

Another object of our invention is the provision of a pressure testing device which is adapted to provide accurate readings of fluid pressures over an extremely wide range of possible pressures.

Another important object of our invention is the provision of a pressure testing device which may be produced at a much lower cost than previous devices capable of similar performance since by utilizing a plurality of pressure sensitive gauges, each with a limited and different pressure range, much less expensive gauges can be used and the overall cost of the device becomes much less than a single gauge having the required relatively great pressure range and also being graduated in sufficient detail to produce satisfactorily accurate pressure readings at relatively moderate pressure ranges.

Another object of this invention is the provision of a pressure testing device which alleviates the obnoxious inconvenience of retaining a plurality of independent gauges of varying pressure ranges, and still provide the other stated objects of this invention.

Still another object of this invention is the provision of a pressure testing device which is equipped with valve means adapted to become actuated at a critical pressure generally equal to the maximum limit of the range of a gauge with which the valve means is associated whereby to protect the gauge from damage by exposure to fluid pressure beyond the range thereof.

A still further object of this invention is the provision of a pressure testing device which is equipped with means for varying and adjusting the actuation of the valve means with respect to the pressure range of the gauge with which the valve means is associated.

Other objects of this invention reside in the provision of a pressure testing device which is simple in construction, requires little or no maintenance, is extremely durable and strong throughout continued use, and highly efficient in the vindication of its purposes.

The above and still further objects of this invention will become apparent from the following detailed specification, appended claims and attached drawings.

Referring to the drawings, wherein like reference characters indicate like parts or elements throughout the several views:

FIG. 1 is a view in elevation of our invention;

FIG. 2 is a greatly enlarged view in elevation, some parts being broken away and some parts shown in section;

FIG. 3 is a view in section taken on the line 3—3 of FIG. 1;

FIG. 4 is a greatly enlarged detail view in vertical section of one of the valves, some parts being broken away; and FIG. 5 is an enlarged view in transverse section taken on the line 5—5 of FIG. 2.

Referring with greater particularity to the drawings, the reference numeral 1 represents our pressure testing device in its entirety. The pressure testing device 1 is contained within a generally circular housing, represented in general by the reference numeral 2, and which comprises a circular front plate 3 and a circular back plate 4, which are connected by a generally annular connecting ring 5. The housing 2 is secured about and to the pressure testing device 1 by means of machine screws 6 which project through the front and back plates 3, 4 of the housing, and are received within corresponding apertures 6a defined in the pressure testing device 1, as seen particularly in FIGS. 1 and 3.

The pressure testing device 1 comprises a rigid body portion, represented in general by the reference numeral 7, which comprises an enlarged central portion 8 and outstanding side portions 9. The body portion 7 is generally centrally bored so as to define a fluid inlet passage 10 which is fitted with a connector or coupling 11 which is adapted to be coupled to a fluid system, not shown, of which it is desired to test the pressure of the fluid, not shown, contained therein. The fluid inlet passage 10 extends to and communicates with a central fluid outlet passage 12 defined in the central portion 8 of the body portion 7. Also, both of the side portions 9, at the general center thereof, define fluid outlet side passages, represented in general by the reference numeral 13; both of said outlet side passages 13 being formed by and comprising axial extending bores 14 and lateral bores 15. The lower ends of the axial bores 14 are tapped and receive adjustable and removable threaded plugs 16, and the lateral bores 15 are sealed at their outward ends by snug fitting insert plugs 17. The portion of the outlet passages 13 formed by the lateral bores 15 open inwardly into the fluid inlet passage 10 so as to provide communication of the outlet passages 13 with the inlet passage 10.

The fluid outlet passages 12, 13 are adapted to be operatively coupled, as by connectors 18, to conventional pressure sensitive gauges, the same being preferably, and as shown, of relatively high, low, and intermediate pressure ranges. The high range gauge is represented by the reference numeral 19, the low range gauge is represented by the reference numeral 20, and the intermediate range gauge is represented by the reference numeral 21. It should be understood that the pressure gauges 19-21 may be of any conventional design since the gauges 19-21 in themselves, do not form a specific part of this invention.

An important part of our invention comprises normally open pressure actuated valves, represented in general by the reference numeral 22, one each of which is disposed in a different one of the outlet passages which communicate with all of the gauges except the gauge having the highest range, the valve receiving outlet passages in the disclosed structure being the passages 13 and the gauges communicating with the valve receiving passages 13 being the low and intermediate range gauges 20, 21. In accordance with our invention, the valves 22 are disposed in the portion of the outlet passages 13 defined by the axial bores 14 in such position as to be intermediate the gauges 20, 21 associated with the outlet passages 13 and the inlet passage 10.

Each of the valves 22 comprises a piston 23 slidably received within the axial bore 14 and spaced in one direction from the lateral bore 15, and a valve seat block 24 slidably received within the axial bore 14 and spaced from the piston 23 in the other direction from the lateral bore 15. The seat block 24 defines an axially extending aperture 25 and a valve seat 26 on the side of the seat block 24 opposite the disposition of the piston 23. The body portion 7 of the pressure testing device 1 defines with the piston 23 and the seat block 24 a pressure chamber 27 into which opens the lateral bore 15 of the outlet passage 13. An elongated valve stem 28 extends slidably through the aperture 25 and is connected at one end, as with the pin 29, to the piston 23 and defines at its other end a valve head portion 30. The valve head portion 30 is movable from a seating position in engagement with the valve seat 26 wherein the valve 22 is closed to an open position in spaced relation to the seat 26, as seen particularly in FIG. 4.

By reference to FIGS. 2 and 4, it will be noted that the seat block 24 of each valve 22 is maintained in spaced relation from the piston 23 so as to be spaced in sufficient operative proximity to the valve head portion 30 of the valve stem 28, said spacing being maintained by means of coiled compression separator springs 31. The valves 22 are adapted to be moved to their respective closed positions at critical pressures generally equal to the maximum limits of the ranges of the respective gauges 20, 21 associated therewith whereby to protect said gauges 20, 21 from damage by exposure to pressure of fluid, not shown, beyond the range of the gauges 20, 21. The actuation of the head portion 30 of the valve stem 28 from its above described open position to its closed position in engagement with the valve seat 26 is accomplished by means of the disposition of coiled compression spring 32 in engagement with the piston 23, as seen particularly in FIGS. 2 and 4. The compression springs 32 are held in their respective positions by means of the adjustable and removable plugs 16 screw threaded within the axial bores 14. The compression springs 32, of course, should be stronger than the separator springs 31 in order that the valves 22 will be maintained in their normally open position, as shown in FIG. 4. It is obvious that different sized springs must be used in connection with the valves 22, the strength of the compression springs 32 increasing in direct proportion to the maximum pressure of the pressure ranges of the respective gauges. It should be noted that it is an easy matter to remove the compression springs 32 and substitute different springs therefor, as well as to adjust the compression of the springs 32 by means of axial adjustment of the threaded plugs 16 thereagainst so as to adjust the compression of the springs 32 to correspond generally to the maximum limit of the range of the gauge associated with each spring 32. For the purpose of sealing the pistons 23 and the seat blocks 24 within the outlet passages 13 containing the valves 22, both the pistons 23 and the seat blocks 24 of the valves 22 define marginal recesses 33, 34 respectively which are adapted to receive O-ring seals 35, 36 respectively. For the purpose of maintaining the valve stem 28 centered with respect to the aperture 25 and the outlet passage 13, a centering block, represented by the reference numeral 37, is disposed within the outlet passage 13 adjacent the valve seat 26, as seen in FIGS. 2 and 4. The centering block 37 defines a valve head receiving recess 38, which defines circumferentially spaced rails 39 for guiding and centering the valve head portion 30. The centering block 37 also defines an aperture 40 to permit passage of fluid, not shown, from the spaces between the rails 39 and into the gauges 20, 21.

Having specifically described our invention, the operative simplicity thereof should be noted. Merely for the purpose of illustration, the respective pressure gauges 19, 20, and 21 are shown as having the respective pressure ranges of from twenty (20) vacuum or negative pressure units to thirty (30) units above atmospheric pressure, zero (0) to six hundred (600) units, and zero (0) to three thousand (3000) units. The pressure testing device 1 is adapted to be connected to a fluid system, not shown, the pressure of which is to be tested, and if the pressure of said fluid system happens to be above the pressure range of one or more of the gauges 20, 21, it is obvious that at the moment when the pressure of the fluid within the pressure chamber 27 becomes generally equal to the maximum limit of the range of the associated gauge, the bias of the compression spring 32 is overcome thereby, and the piston 23 is moved in a direction away from the seat block 24 so as to move the valve stem 28 and seat the valve head portion 30 against the valve seat 26 and close the valve 22. It is manifest that the force exerted by the compression spring 32 against the piston 23 must be generally equal to the maximum limit of the pressure range of the associated gauge, and said force may be adjusted by the threaded plugs 16 in the above described manner. Although the separate valves 22 are equipped with suitable compression springs 32 and adjusted to correspond to the range of the gauges associated therewith, the operation of each valve corresponds to the above described valve operation. It should be obvious that when the pressure testing device 1 is disconnected from a fluid system the valves 22 are returned to their open position by the bias of the compression springs 32 when the pressure within the pressure chambers 27 is relieved by such disconnection As shown in FIG. 4, the threaded plugs 16 are suitably vented, as by apertures 16a, to prevent fluid pressure from building up in the bores 14 between the pistons 23 and their respective plugs 16.

This invention has been thoroughly tested and found to be completely satisfactory for the accomplishment of the above objects; and while we have shown a preferred embodiment thereof, we wish it to be specifically understood that the same may be modified without departure from the scope and spirit of the appended claims.

What we claim is:

1. A pressure testing device comprising:
    (a) a body having a fluid inlet passage and multiple fluid outlet passages in communication with said inlet passage, said fluid outlet passages each comprising a generally cylindrical bore defined in said body,
    (b) said fluid outlet passages each having an outlet end portion adapted for connection to a pressure sensitive gauge, and
    (c) a normally open pressure actuated valve disposed in one of said bores intermediate said inlet passage and the gauge associated with said one of the bores, said valve comprising:
        (1) a generally cylindrical piston disposed for axial movement in said one bore,
        (2) a generally cylindrical valve seat element disposed within said one bore between said passage outlet end portion and said piston element, said valve seat element being further disposed in axially spaced relation to said piston and defining therebetween and with the bore a pressure chamber for the reception of fluid from said inlet passage, (3) said valve seat element defining a generally annular valve seat on the side thereof adjacent said outlet end portion of the passage, (4) said valve seat element defining an aperture which extends therethrough in a generally axial direction, (5) a valve stem generally co-axially received within said one bore and having an intermediate portion which is received in and projects through the aperture of said valve seat element and also having one end portion secured to said said piston, said valve stem further having a head portion for valve closing engagement with the valve seat of said valve seat element, and (6) yielding means urging said piston in a direction to move said valve stem head portion away from seating engagement with the valve seat, the bias of said yielding means being such as to be overcome by an increase in fluid pressure in said chamber approaching the limit of pressure measurement of the associated gauge, said one bore being of uniform diameter and a plug threaded in one end of said bore for supporting the yielding means.

2. A pressure testing device comprising:

(a) a body having a fluid inlet passage and multiple fluid outlet passages in communication with said inlet passage, said fluid outlet passages each comprising a generally cylindrical bore defined in said body, (b) said fluid outlet passages each having an outlet end portion adapted for connection to a pressure sensitive gauge, and (c) a normally open pressure actuated valve disposed in one of said bores intermediate said inlet passage and the gauge associated with said one of the bores, said valve comprising:

(1) a generally cylindrical piston disposed for axial movement in said one bore, (2) a generally cylindrical valve seat element disposed within said one bore between said passage outlet end portion and said piston element, said valve seat element being further disposed in axially spaced relation to said piston and defining therebetween and with the bore a pressure chamber for the reception of fluid from said inlet passage, (3) said valve seat element defining a generally annular valve seat on the side thereof adjacent said outlet end portion of the passage, (4) said valve seat element defining an aperture which extends therethrough in a generally axial direction, (5) a valve stem generally co-axially received within said one bore and having an intermediate portion which is received in and projects through the aperture of said valve seat element and also having one end portion secured to said piston, said valve stem further having a head portion for valve closing engagement with the valve seat of said valve seat element, (6) yielding means urging said piston in a direction to move said valve stem head portion away from seating engagement with the valve seat, the bias of said yielding means being such as to be overcome by an increase in fluid pressure in said chamber approaching the limit of pressure measurement of the associated gauge, and (7) separator means interposed between said piston and the valve seat element and operative to maintain said piston and valve seat element at a given minimum axially spaced apart relationship, said separator means comprising a coil spring the bias of which is less than the above said yielding means.

3. A pressure testing device comprising:

(a) a body having a fluid inlet passage and multiple fluid outlet passages in communication with said inlet passage, said fluid outlet passages each comprising a generally cylindrical bore defined in said body, (b) said fluid outlet passages each having an outlet end portion adapted for connection to a pressure sensitive gauge, (c) a normally open pressure actuated valve disposed in one of said bores intermediate said inlet passage and the gauge associated with said one of the bores, said valve comprising:

(1) a generally cylindrical piston disposed for axial movement in said one bore, (2) a generally cylindrical valve seat element disposed within said one bore between said passage outlet end portion and said piston element, said valve seat element being further disposed in axially spaced relation to said piston and defining therebetween and with the bore a pressure chamber for the reception of fluid from said inlet passage, (3) said valve seat element defining a generally annular valve seat on the side thereof adjacent said outlet end portion of the passage, (4) said valve seat element defining an aperture which extends therethrough in a generally axial direction, (5) a valve stem generally co-axially received within said one bore and having an intermediate portion which is received in and projects through the aperture of said valve seat element and also having one end portion secured to said piston, said valve stem further having a head portion for valve closing engagement with the valve seat of said valve seat element, (6) yielding means urging said piston in a direction to move said valve stem head portion away from seating engagement with the valve seat, the bias of said yielding means being such as to be overcome by an increase in fluid pressure in said chamber approaching the limit of pressure measurement of the associated gauge, and (7) separator means interposed between said piston and the valve seat element and operative to maintain said piston and valve seat element at a given minimum axially spaced apart relationship, said separator means comprising a coil spring the bias of which is less than the above said yielding means, and (d) a centering block disposed within said one bore intermediate the passage outlet end portion and said valve seat element, said centering block defining a recess which opens toward said valve element and receives the head portion of said valve stem, said centering block further defining an aperture which extends therethrough in a generally axial direction, and said centering block also defining a plurality of circumferentially spaced generally axially extended rails which engage the periphery of said head portion of the valve stem for guiding and centering the same during the axially directed movement thereof.

References Cited in the file of this patent

UNITED STATES PATENTS

| | | |
|---|---|---|
| 1,613,076 | Bird | Jan. 4, 1927 |
| 2,058,858 | Fetyko | Oct. 27, 1936 |
| 2,725,749 | Green | Dec. 6, 1955 |
| 2,981,110 | Fenn et al. | Apr. 25, 1961 |
| 2,984,109 | Savage et al. | May 16, 1961 |

FOREIGN PATENTS

| | | |
|---|---|---|
| 767,433 | Great Britain | Feb. 6, 1957 |